(12) United States Patent
Kawakami et al.

(10) Patent No.: US 6,953,083 B2
(45) Date of Patent: Oct. 11, 2005

(54) CONDENSER

(75) Inventors: Yasunobu Kawakami, Wako (JP); Tsutomu Takahashi, Wako (JP); Hiroyoshi Taniguchi, Wako (JP); Hiroyuki Niikura, Wako (JP); Kiyoshi Katahira, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 111 days.

(21) Appl. No.: 10/221,858

(22) PCT Filed: Mar. 16, 2001

(86) PCT No.: PCT/JP01/02111

§ 371 (c)(1),
(2), (4) Date: Dec. 30, 2002

(87) PCT Pub. No.: WO01/69161

PCT Pub. Date: Sep. 20, 2001

(65) Prior Publication Data

US 2003/0106333 A1 Jun. 12, 2003

(30) Foreign Application Priority Data

Mar. 17, 2000 (JP) ........................................ 2000-081762

(51) Int. Cl.[7] ............................................... F28D 11/06
(52) U.S. Cl. ......................... 165/84; 165/114; 165/119
(58) Field of Search ........................... 165/84, 110, 111, 165/114, 119

(56) References Cited

U.S. PATENT DOCUMENTS

| | | | |
|---|---|---|---|
| 2,503,595 A | * | 4/1950 | Preston ........................ 165/156 |
| 2,858,111 A | | 10/1958 | Ainsworth et al. |
| 2,983,115 A | * | 5/1961 | Caswell ........................ 62/285 |
| 3,180,405 A | | 4/1965 | Hinde |
| 3,789,617 A | * | 2/1974 | Rannow ........................ 62/115 |
| 3,837,396 A | * | 9/1974 | Newton ........................ 165/111 |
| 3,935,715 A | | 2/1976 | Newton |
| 4,177,859 A | * | 12/1979 | Gatti et al. ............... 165/134.1 |
| 5,141,048 A | * | 8/1992 | Sausner ........................ 165/110 |
| 5,653,281 A | * | 8/1997 | Berg et al. .................. 165/113 |
| 2002/0084063 A1 | * | 7/2002 | Gawthrop et al. ........... 165/110 |

FOREIGN PATENT DOCUMENTS

| | | |
|---|---|---|
| EP | 0 851 188 A2 | 7/1998 |
| JP | 5-26539 A | 2/1983 |
| JP | 58-48076 A | 3/1983 |
| JP | 60-176393 U | 11/1985 |
| JP | 63-91467 A | 4/1988 |

* cited by examiner

Primary Examiner—Allen J. Flanigan
(74) Attorney, Agent, or Firm—Birch, Stewart, Kolasch & Birch, LLP

(57) ABSTRACT

A condenser is provided that makes a liquid droplet of a liquid phase medium drop effectively, the liquid phase medium residing in a lower end opening of a medium passage of the condenser, thereby preventing any degradation in the performance of the condenser. In the condenser, vapor, which is supplied to a cooling pipe (14) connected to cooling fins (16), is cooled, condensed into water, and recovered in a water-collecting tray (21) provided beneath the cooling pipe (14), and a needle-shaped member (24) provided so as to face the lower end opening of the cooling pipe (14) ruptures the droplet that, due to surface tension, resides in the lower end opening of the cooling pipe (14) and makes it drop into the water-collecting tray (21). A plate-form filter can be used instead of the needle-shaped member (24), and in this case not only can the droplet be made to drop from the lower end opening of the cooling pipe (14) more effectively due to the capillary action of the filter, but also dust contained in the water can be removed.

8 Claims, 9 Drawing Sheets

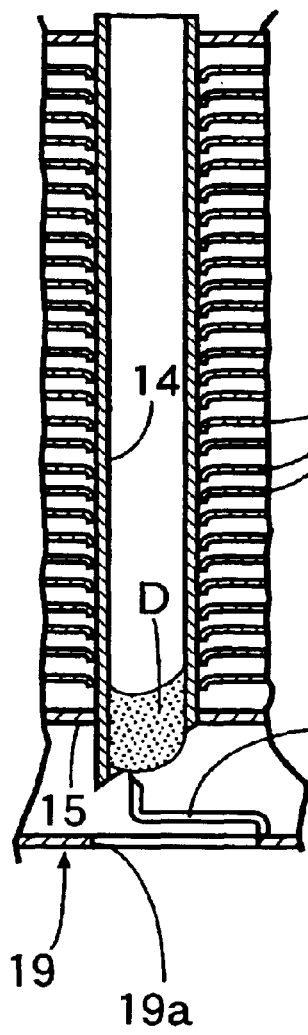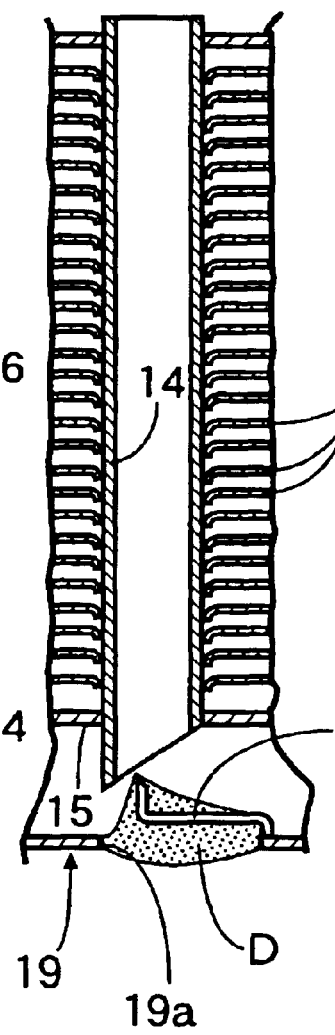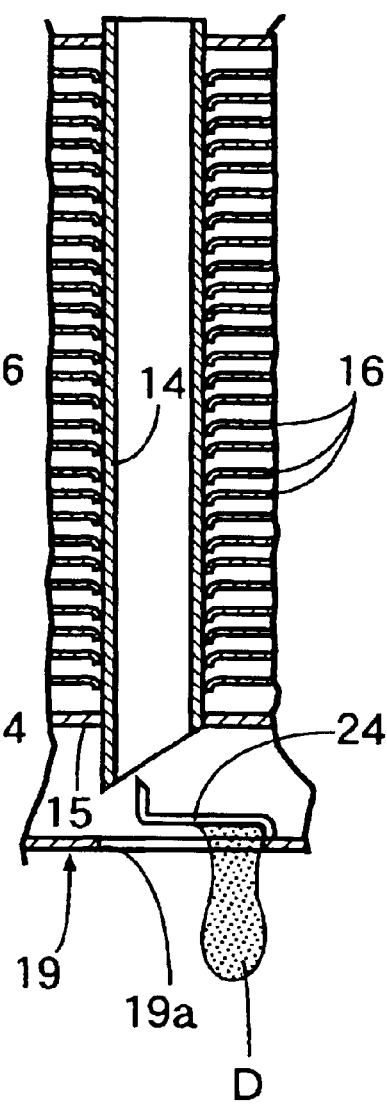

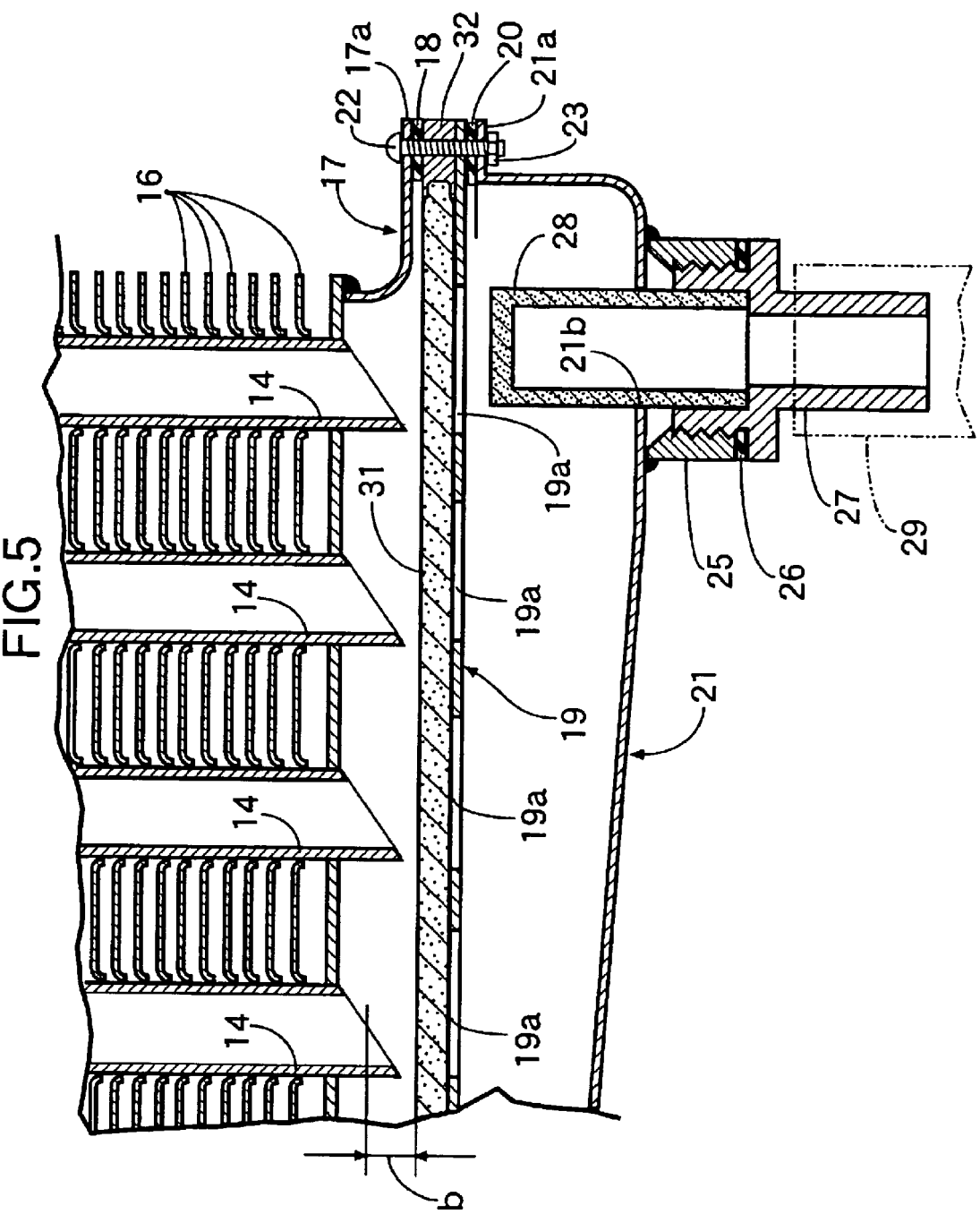

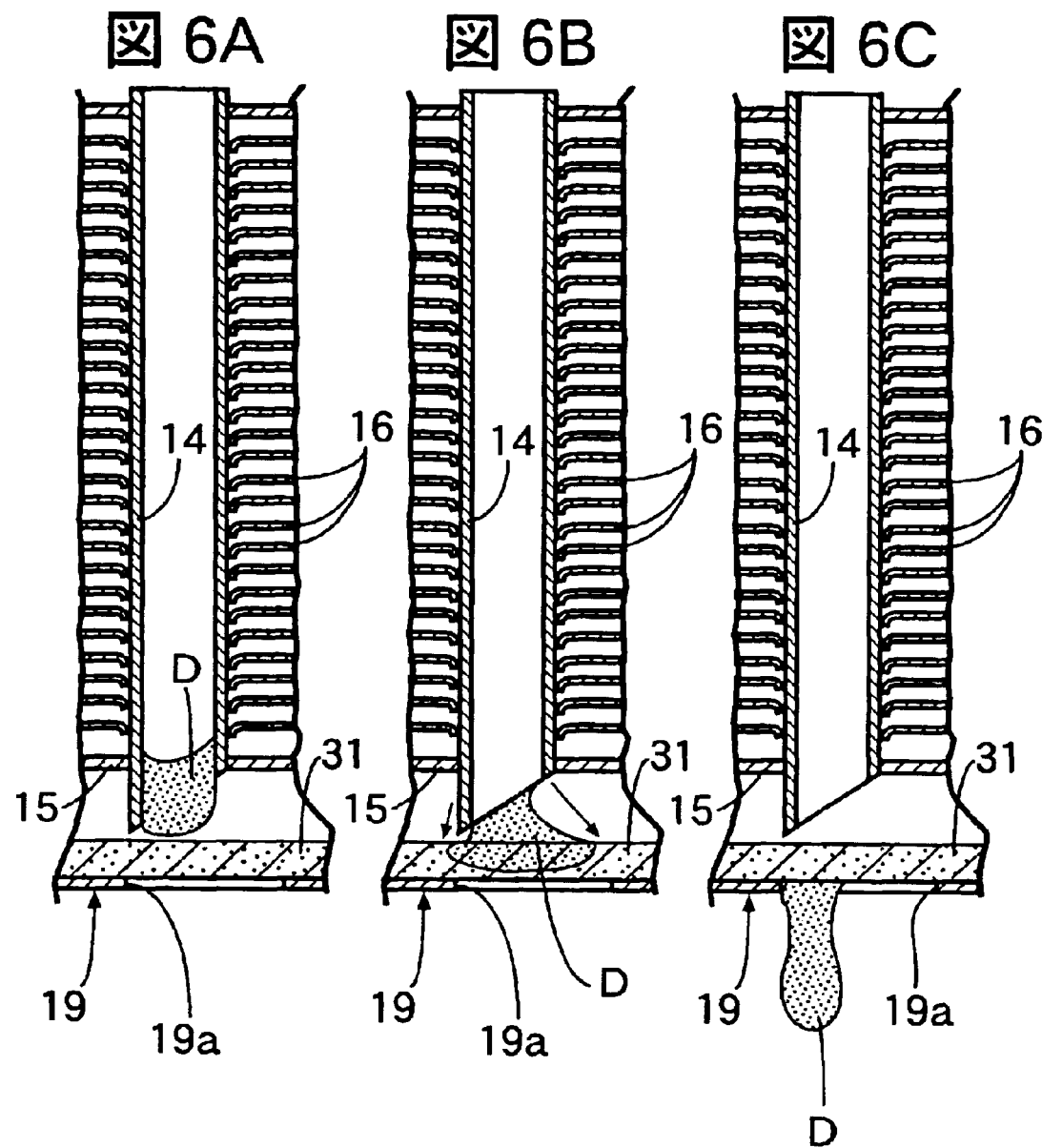

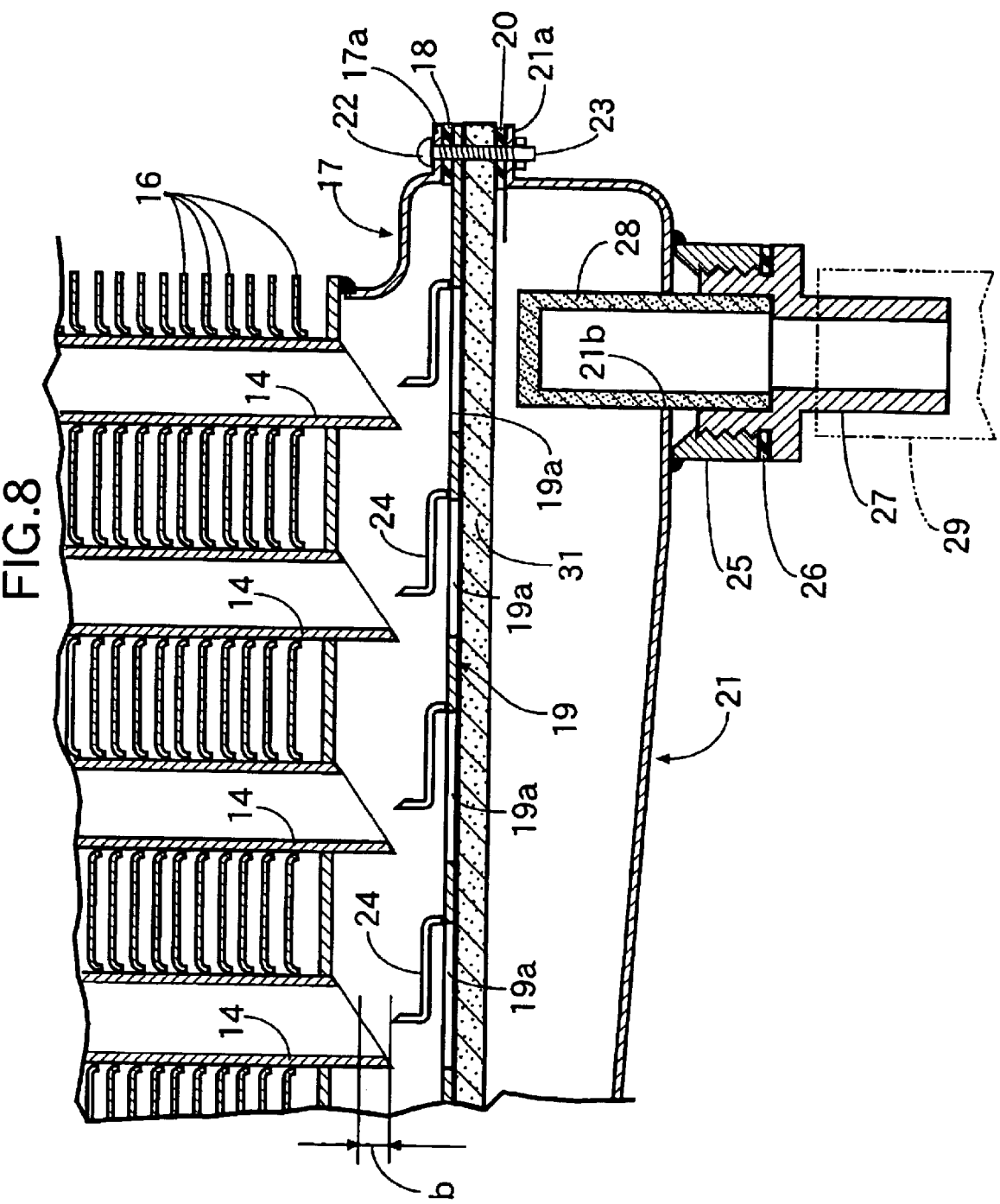

CONDENSER

This application is the national phase under 35 U.S.C. §371 of PCT International Application No. PCT/JP01/02111 which has an International filing date of Mar. 16, 2001, which designated the United States of America.

FIELD OF THE INVENTION

The present invention relates to a condenser that cools a gas phase medium, which is supplied to a medium passage connected to heat-releasing means, by heat exchange with the heat-releasing means, and recovers the gas phase medium as a liquid phase medium by condensation into liquid phase medium recovery means provided beneath the medium passage.

BACKGROUND ART

Japanese Patent Application Laid-open No. 58-48076 discloses a Rankine cycle system comprising a vane-type expander. This converts the pressure energy of high temperature high pressure vapor generated in a vaporizer employing a gas burner as a heat source into mechanical energy via a vane-type expander, and the vapor thereby generated, whose temperature and pressure have decreased, is condensed in a condenser and then returned to the vaporizer via a water supply pump.

As shown in FIGS. 9A to 9C, a condenser that condenses and coverts a gas phase medium into a liquid phase medium generally comprises a large number of cooling fins 01 that are stacked with gaps through which a cooling medium can pass, and a large number of cooling pipes 02 that run vertically through these cooling fins 01, the gas phase medium supplied from the upper end of the cooling pipe 02 being drained of heat by the cooling fins 01, so as to condense into the liquid phase medium while passing through the interior of the cooling pipe 02, and dripping from the lower end of the cooling pipe 02.

In order to reduce the dimensions of the condenser for condensing and converting a gas phase medium into a liquid phase medium and maintain a high level of heat exchange per unit volume with the gas phase medium, it is necessary to reduce the diameter of the cooling pipe 02, but when the cooling pipe 02 is narrow, it is easy for a droplet D that has been formed into a sphere from the liquid phase medium due to surface tension to reside in the lower end of the cooling pipe 02 under the influence of the surface tension and it becomes difficult for it to drop. When the lower end of the cooling pipe 02 is blocked in this way by the droplet D, it becomes difficult for the gas phase medium to flow through the interior of the cooling pipe 02, thus greatly degrading the performance of the condenser, and it is therefore necessary to remove by some means the droplet D residing in the lower end of the cooling pipe 02.

DISCLOSURE OF THE INVENTION

The present invention has been carried out in view of the above-mentioned circumstances, and the object thereof is to promote the effective dropping of a liquid phase medium that resides in a lower end opening of a medium passage of a condenser, thereby preventing any degradation in the performance of the condenser.

In order to accomplish the above-mentioned object, in accordance with the present invention, there is proposed a condenser that cools a gas phase medium, which is supplied to a medium passage connected to heat-releasing means, by heat exchange with the heat-releasing means, and recovers the gas phase medium as a liquid phase medium by condensation into liquid phase medium recovery means provided beneath the medium passage, characterized in that the condenser comprises droplet rupturing means that makes contact with a droplet of a liquid phase medium that resides in a lower end opening of the medium passage, ruptures the droplet, and recovers the liquid phase medium into the liquid phase medium recovery means.

In accordance with this arrangement, by making the droplet rupturing means come into contact with the droplet of the liquid phase medium that resides in the lower end opening of the medium passage of the condenser, the droplet rupturing means ruptures the droplet, thereby making it drop quickly into the liquid phase medium recovery means via the lower end opening of the medium passage. In this way, it is possible to reduce the period of time during which the lower end opening of the medium passage is blocked with the droplet and ensure smooth flow of the gas phase medium through the medium passage, thereby preventing any degradation in the performance of the condenser.

Furthermore, in addition to the above-mentioned arrangement, there is proposed a condenser wherein the distance between the lower end opening of the medium passage and the upper end of the droplet rupturing means is set smaller than the maximum vertical dimension of the droplet.

In accordance with this arrangement, since the upper end of the droplet rupturing means is positioned in the proximity of the lower end opening of the medium passage, the liquid phase medium droplet that resides in the lower end opening of the medium passage can make contact with the droplet rupturing means so that it drops before growing large, thereby minimizing the period of time during which the lower end opening of the medium passage is blocked with the droplet.

Moreover, in addition to the above-mentioned arrangement, there is proposed a condenser wherein the droplet rupturing means resonates with externally input vibration and moves relative to the droplet.

In accordance with this arrangement, since the droplet rupturing means resonates with the externally input vibration and moves relative to the droplet, thus increasing the opportunity for the droplet rupturing means to come into contact with the droplet, the droplet rupturing means can rupture the droplet effectively so as to make it drop via the lower end opening of the medium passage.

Furthermore, in addition to the above-mentioned arrangement, there is proposed a condenser wherein the droplet rupturing means includes a filter for filtering the liquid phase medium.

In accordance with this arrangement, since the droplet rupturing means includes the filter, not only can the ruptured droplet be drawn in quickly from the lower end opening of the medium passage by capillary action of the filter, but also the droplet thus drawn in can be filtered by the filter so as to remove dust.

A cooling pipe 14 of embodiments corresponds to the medium passage of the present invention, a cooling fin 16 of the embodiments corresponds to the heat-releasing means of the present invention, a water-collecting tray 21 of the embodiments corresponds to the liquid phase medium collecting means of the present invention, and a needle-shaped member 24 and a filter 31 of the embodiments correspond to the droplet rupturing means of the present invention.

BRIEF DESCRIPTION OF THE DRAWINGS

FIG. 1 to FIG. 4C show a first embodiment of the present invention.

FIG. 1 is a diagram showing the overall arrangement of a Rankine cycle system of an internal combustion engine.

FIG. 2 is a longitudinal cross section of a condenser.

FIG. 3 is a magnified view of an essential part in FIG. 2.

FIG. 4A to FIG. 4C are diagrams for explaining a process in which the droplet is ruptured.

FIG. 5 to FIG. 6C show a second embodiment of the present invention.

FIG. 5 is a view corresponding to FIG. 3 above.

FIG. 6A to FIG. 6C are explanatory diagrams.

FIG. 8 is a view, corresponding to FIG. 3 above, of a fourth embodiment of the present invention.

BEST MODE FOR CARRYING OUT THE INVENTION

The first embodiment of the present invention is explained below by reference to FIG. 1 to FIG. 4C.

Figure 1:
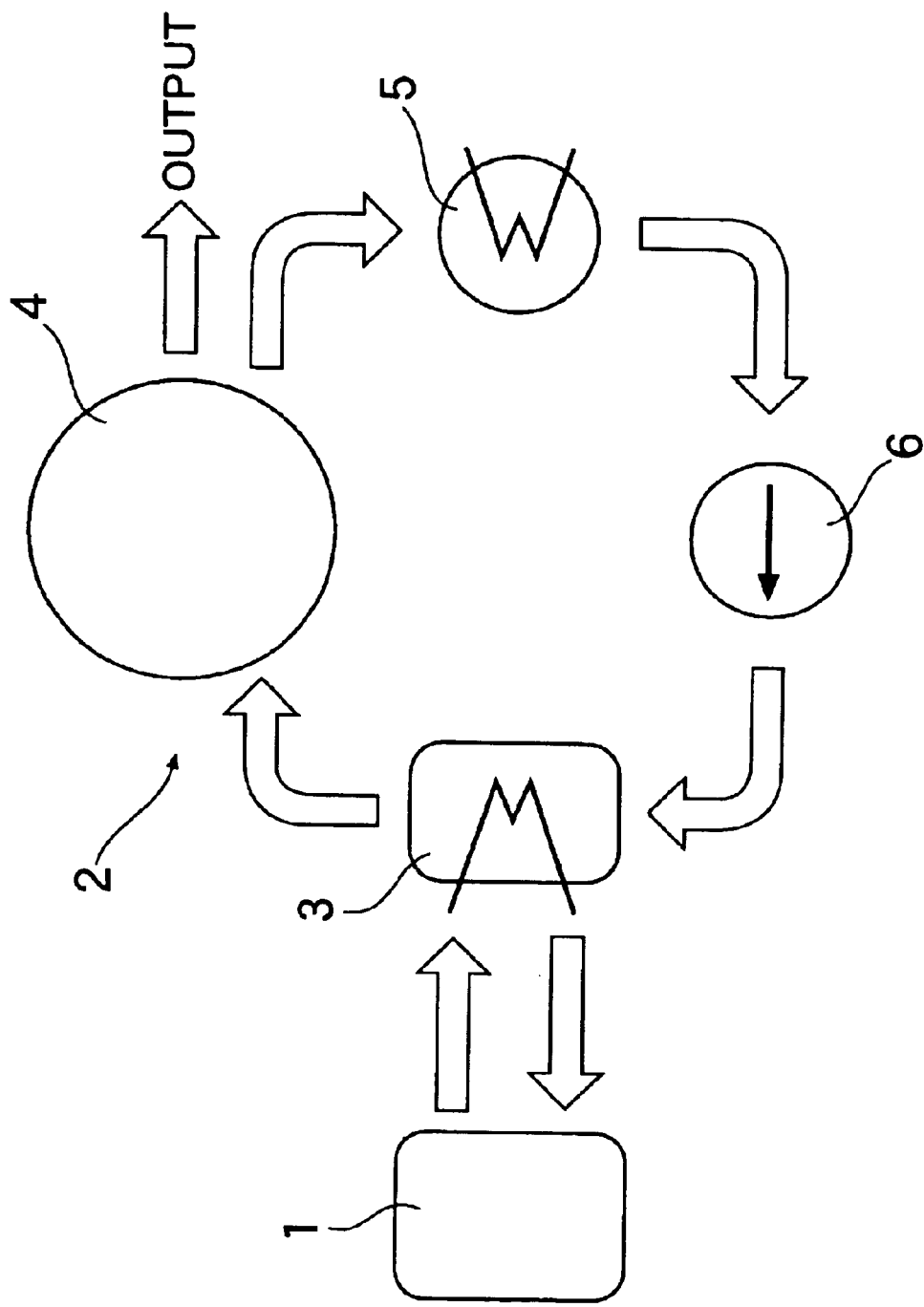

FIG. 1 shows the overall arrangement of a Rankine cycle system 2 of an internal combustion engine 1 in which a condenser of the present invention is employed, the system including a vaporizer 3 for heating water, which is a working medium, using exhaust gas from the internal combustion engine 1 as a heat source so as to generate high temperature high pressure vapor, an expander 4 for converting the pressure energy of the high temperature high pressure vapor into mechanical energy, a condenser 5 for liquefying and condensing the reduced temperature reduced pressure vapor discharged from the expander 4, and a water supply pump 6 for pressurizing and supplying water from the condenser 5 to the vaporizer 3.

Figure 2:
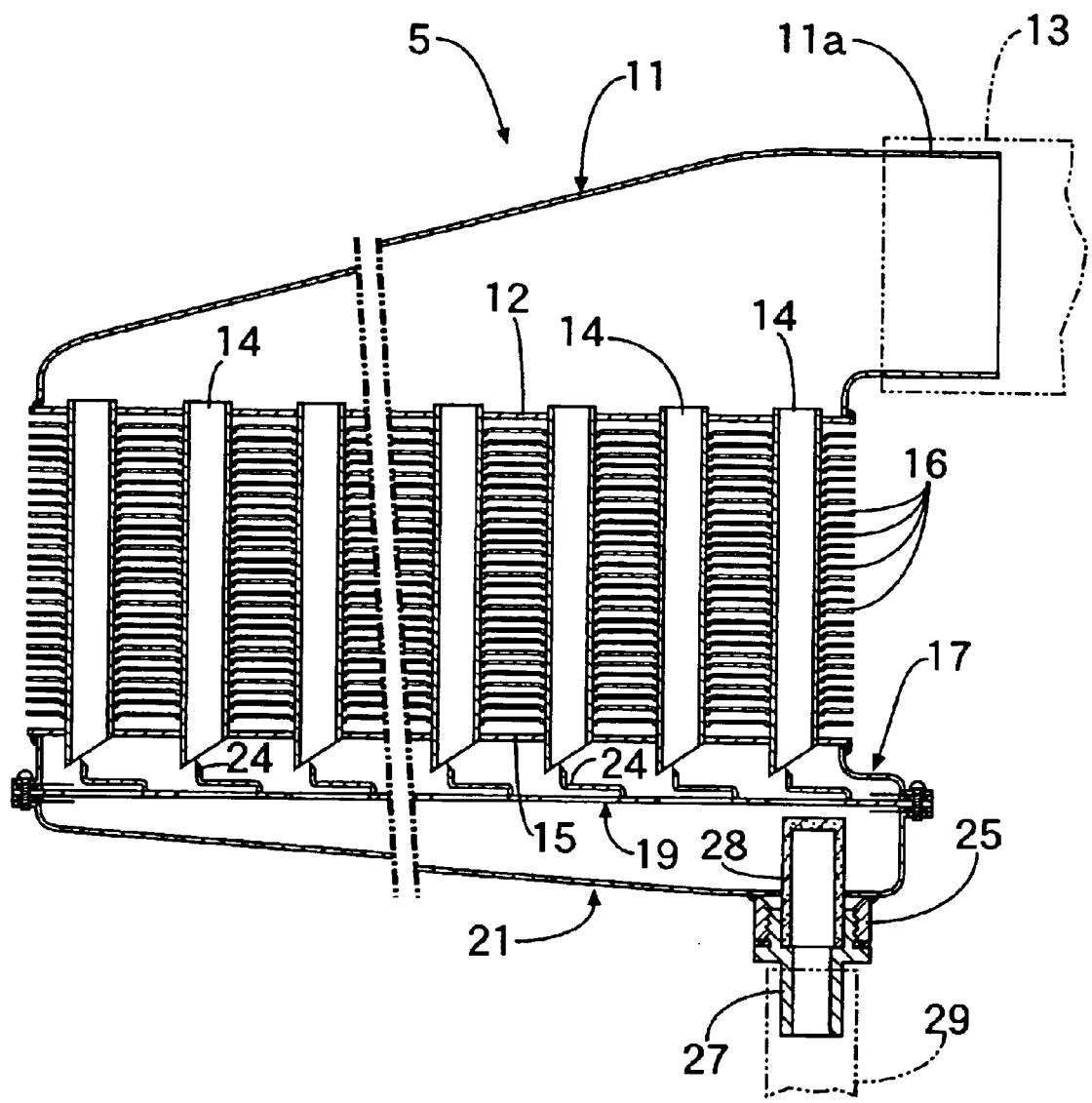
Figure 3:
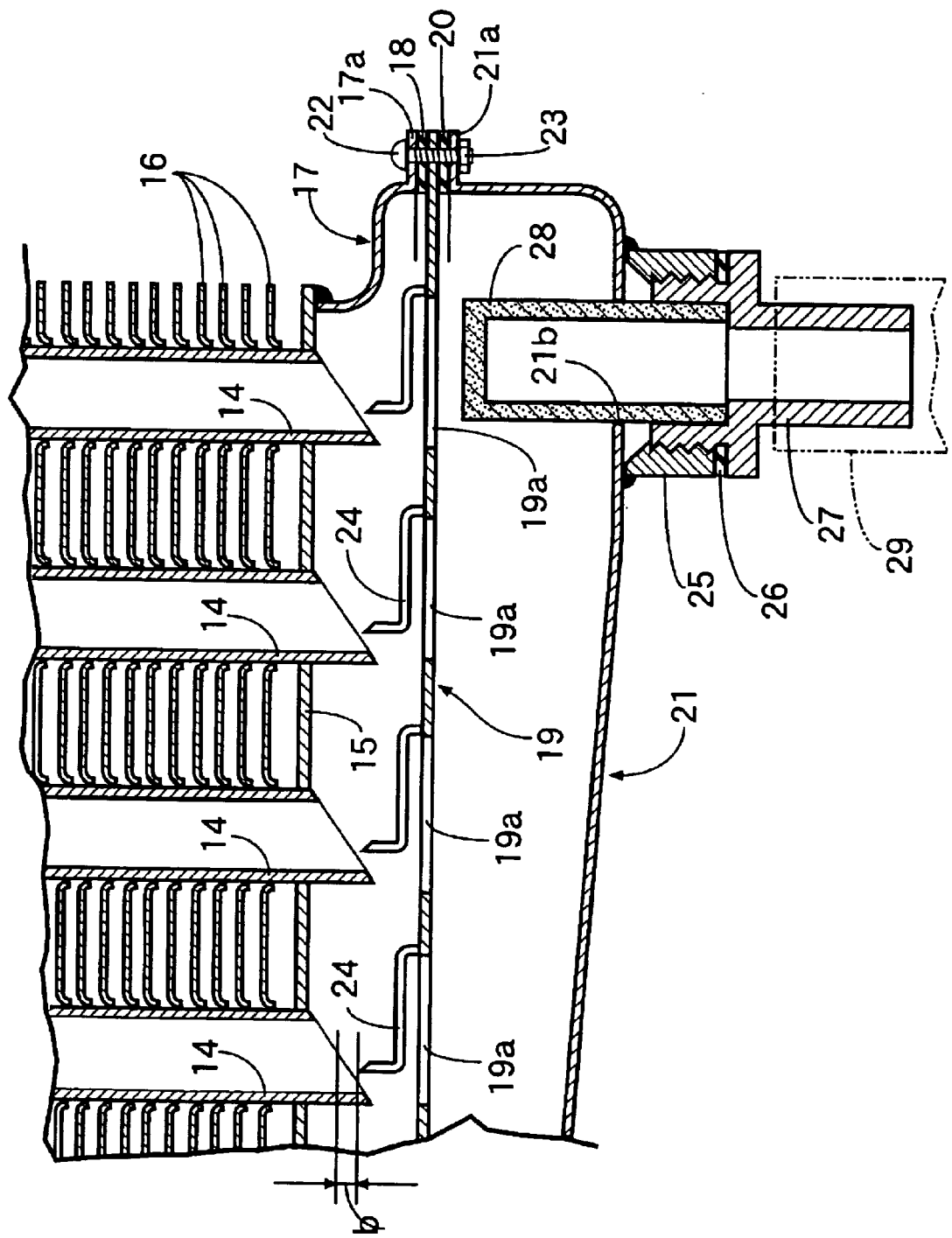

The structure of the condenser 5 is now explained by reference to FIG. 2 and FIG. 3.

An upper housing 11 provided in an upper part of the condenser 5 is a container-shaped member which has a cylindrical joint 11a formed integrally on one end in the longitudinal direction and whose lower face opening is blocked by welding an upper base plate 12, the joint 11a being connected to the expander 4 (see FIG. 1) via a vapor supply pipe 13. Fixed to the upper base plate 12 of the upper housing 11 are the upper ends of a large number of vertically extending cooling pipes 14, the vicinities of the lower ends of cooling pipes 14 being fixed to a lower base plate 15.

Reducing the diameter of the cooling pipes 14 makes it difficult for droplets of a liquid phase medium to be removed because of the strong influence of capillary action caused by the surface tension of the liquid phase medium, and the droplets that are finally formed will easily block the interiors of the cooling pipes 14. The droplets will not drop until the self weight, which depends on the diameter of the droplets, is in balance with the surface tension and the diameter of the droplets will grow larger than that of the cooling pipes 14. It has been found that by setting the clearance between the ends of the cooling pipes 14 and droplet rupturing means, which will be described later, the same as or less than the droplet diameter, which is substantially determined by the surface tension of the liquid phase medium, the droplets generated from the liquid phase medium can be ruptured efficiently. The cooling pipes 14 have upper end openings, which are cut off at right angles, running through the upper base plate 12 and communicating with the inner space of the upper housing 11 and diagonally cut lower end openings running through the lower base plate 15 and extending downward. Stacked via a fixed space between the upper base plate 12 and the lower base plate 15 are a large number of cooling fins 16, which are thin metal sheets, the cooling pipes 14 running vertically through these cooling fins 16. The cooling fins 16 and the cooling pipes 14 are in intimate contact with each other at a running-through portion without any gaps so that heat transfer is carried out efficiently.

A lower housing 17 whose upper end is welded to an outer peripheral part of the lower base plate 15 has a flange 17a formed by bending outward an outer peripheral part of a lower end of the lower housing 17. Superimposed on the lower face of the flange 17a are a first seal 18, an outer peripheral part of a partition 19, a second seal 20, and a flange 21a of a water collecting tray 21, the flange 21a being formed by bending outward an outer peripheral part of the upper end of the water-collecting tray 21, which has an open upper face, and all thereof being fastened together by a plurality of bolts 22 and nuts 23. Formed in the partition 19 are a large number of openings 19a facing the lower end openings of the cooling pipes 14, and formed on the upper face of the partition 19 are a large number of needle-shaped members 24 bent in a crank shape. The extremity of each of the needle-shaped members 24 extends upward and faces the lower end opening of the corresponding cooling pipe 14.

The lower face of the water-collecting tray 21 is inclined so that one end thereof in the longitudinal direction is low, and a nut 25 is welded to the lower face of the lowest section of the water-collecting tray 21. A bottomed cylindrical ceramic strainer 28 is fixed to a joint 27 screwed into the nut 25 via a seal 26, and an upper part of the ceramic strainer 28 passes through an opening 21b of the water-collecting tray 21 and extends into the inner space of the water-collecting tray 21. The joint 27 is connected to the water supply pump 6 (see FIG. 1) via a water drain pipe 29.

The action of the condenser 5 having the above-mentioned arrangement is now explained.

The vapor, as the gas phase medium, supplied from the expander 4 to the interior of the upper housing 11 of the condenser 5 via the vapor supply pipe 13 is cooled by contact with the inner walls of the cooling pipes 14 while entering them from the inner space of the upper housing 11 and flowing downward in the cooling pipes 14. The cooling pipes 14 whose temperature has increased by heat exchange with the vapor are cooled by heat exchange with the cooling fins 16 exposed to cooling air. The gas phase vapor cooled within the cooling pipes 14 condenses into liquid phase water, flows down along the surface of the walls of the cooling pipes 14, reaches the lower end openings, and forms the spherical droplets D by the action of surface tension (see FIG. 4A).

Figure 9A:
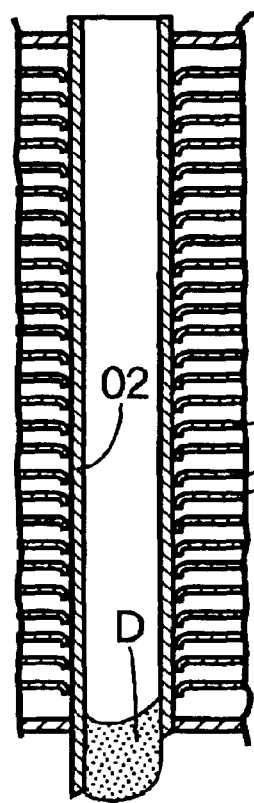
FIG. 9A to FIG. 9C are diagrams showing the growth of a droplet in a cooling pipe of a conventional condenser.
Figure 9B:
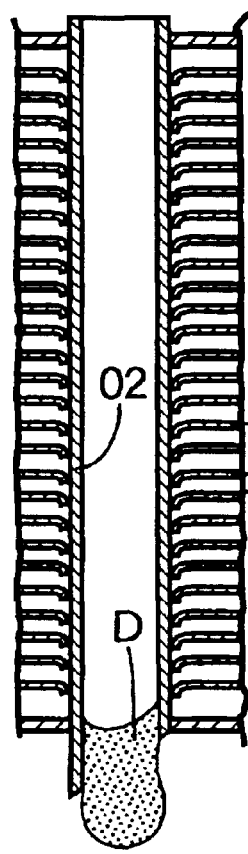
Figure 9C:
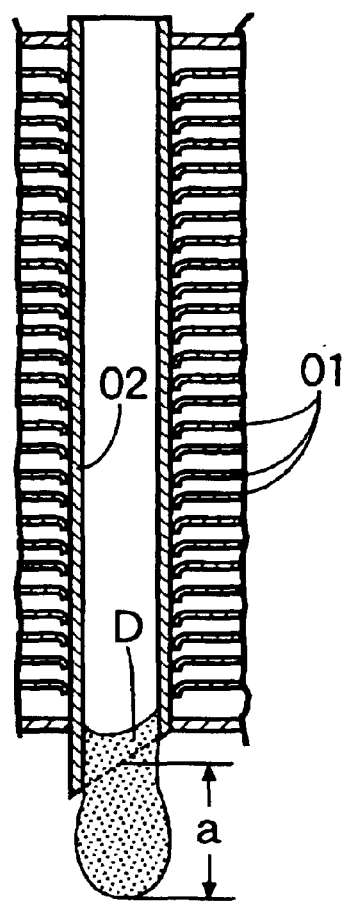

In order for the droplet to drop spontaneously from the lower end opening of the cooling pipes 14, as shown in FIG. 9C, it is necessary for the droplet D to grow so that the vertical dimension of the droplet D (the distance between the lower end of the droplet D and the center position of the diagonally cut lower end opening of the cooling pipe 14) becomes at least a length a, but since the length b (see FIG. 3) from the opening of the cooling pipe 14 to the upper end of the needle-shaped member 24 is set shorter than a in this embodiment, the droplet D comes into contact with the upper end of the needle-shaped member 24 before it grows to a size at which it will drop spontaneously. As a result, the droplet D is ruptured, flows along the needle-shaped member 24 (see FIG. 4B), and drops onto the water-collecting tray 21 via the opening 19a of the partition 19 beneath the needle-shaped member 24 (see FIG. 4C).

Water that has thus dropped onto the water-collecting tray 21 via the openings 19a of the partition 19 from the large number of cooling pipes 14 is filtered through the ceramic strainer 28 provided at the lowest point of the water-collecting tray 21, and then supplied to the water supply pump 6 via the water drain pipe 29.

As hereinbefore described, since the droplets D that reside in the lower end openings of the cooling pipes 14 are forcibly ruptured with the needle-shaped members 24 so that they drop, the lower end openings of the cooling pipes 14 can be opened before the droplets D grow large, thus ensuring smooth flow of the vapor within the cooling pipes 14 and thereby enhancing the condensation effect. In this case, if the needle-shaped members 24 are water-repellent, the droplets D cannot be ruptured effectively, and it is therefore preferable to form the needle-shaped members 24 using a hydrophilic member or coat them with a hydrophilic member. Furthermore, it is preferable for the surface tension of the needle-shaped members 24, which are droplet rupturing means, to be greater than that of the cooling pipes 14 and that of the droplets.

When the vibration accompanying operation of the internal combustion engine 1 or the expander 4 is transmitted to the condenser 5, since the partition 19 of the condenser 5 and the needle-shaped members 24 provided thereon resonate, the opportunity for the needle-shaped members 24 to make contact with the droplets D increases, and the needle-shaped members 24 break up the surface of the droplets D, thereby further promoting rupture of the droplets D. Resonance of the cooling pipes 14 themselves can also promote the dropping of the droplets D.

It is also possible to attach a mass to a part of the partition 19 for the purpose of promoting the resonance of the partition 19. The lower end openings of the cooling pipes 14 are diagonally cut so as to make separation of the droplets D easy.

Next, the second embodiment of the present invention is explained by reference to FIG. 5 to FIG. 6C.

A condenser 5 of the second embodiment comprises, instead of the needle-shaped members 24 of the condenser 5 of the first embodiment, a sheet-form filter 31, which is superimposed on the upper face of a partition 19. A first seal 18 and a flange 17a of a lower housing 17 are superimposed on the upper face of a metal gasket 32 supporting an outer peripheral part of the filter 31; a partition 19, a second seal 20, and a flange 21a of a water-collecting tray 21 are superimposed on the lower face of the metal gasket 32; and all thereof are fastened together by bolts 22 and nuts 23.

Provision of the gasket 32 can not only prevent the filter 31 from deforming due to the tightening force of the bolts 22 and prevent water from leaking through the outer periphery of the filter 31, but can also make the filter 31 resonate effectively, thereby enhancing the effect of rupturing the droplets D. In the present embodiment, the length b (see FIG. 5) from openings of cooling pipes 14 to the upper end of the filter 31 is set shorter than the maximum vertical dimension a of the droplets D. Although a metal or a polymer can be employed as a material for the filter 31, it is desirable for the material to be hydrophilic.

As shown in FIG. 6A, when the droplet D grows in the lower end opening of the cooling pipe 14 and the lower end of the droplet D comes into contact with the upper face of the filter 31, as shown in FIG. 6B, the droplet D is ruptured and is quickly drawn in from the lower end opening of the cooling pipe 14 by the capillary action of the filter 31. As shown in FIG. 6C, the water is filtered of dust by the filter 31, drops down onto the water-collecting tray 21, and is collected.

In addition to the function and effect of the first embodiment, the second embodiment can further attain the effects of quickly drawing in the droplets D by the capillary action of the filter 31 and removing dust by the filtration effect of the filter 31. Moreover, provision of the filter 31 can reduce the size of a ceramic strainer 28 or eliminate the ceramic strainer 28 because of the filtration effect of the filter 31. That is, the provision of the filter 31 can minimize the amount of dust that reaches the ceramic strainer 28, particularly if the diameter of dust that can filter through the filter 31 is set larger than the diameter of dust that can filter through the ceramic strainer 28; since large dust is filtered out by the filter 31, the ceramic strainer 28 only needs to filter out dust having a small diameter, and as a result its filtration effect can be maintained over a long period of time, thereby increasing the lifespan thereof.

Figure 7:
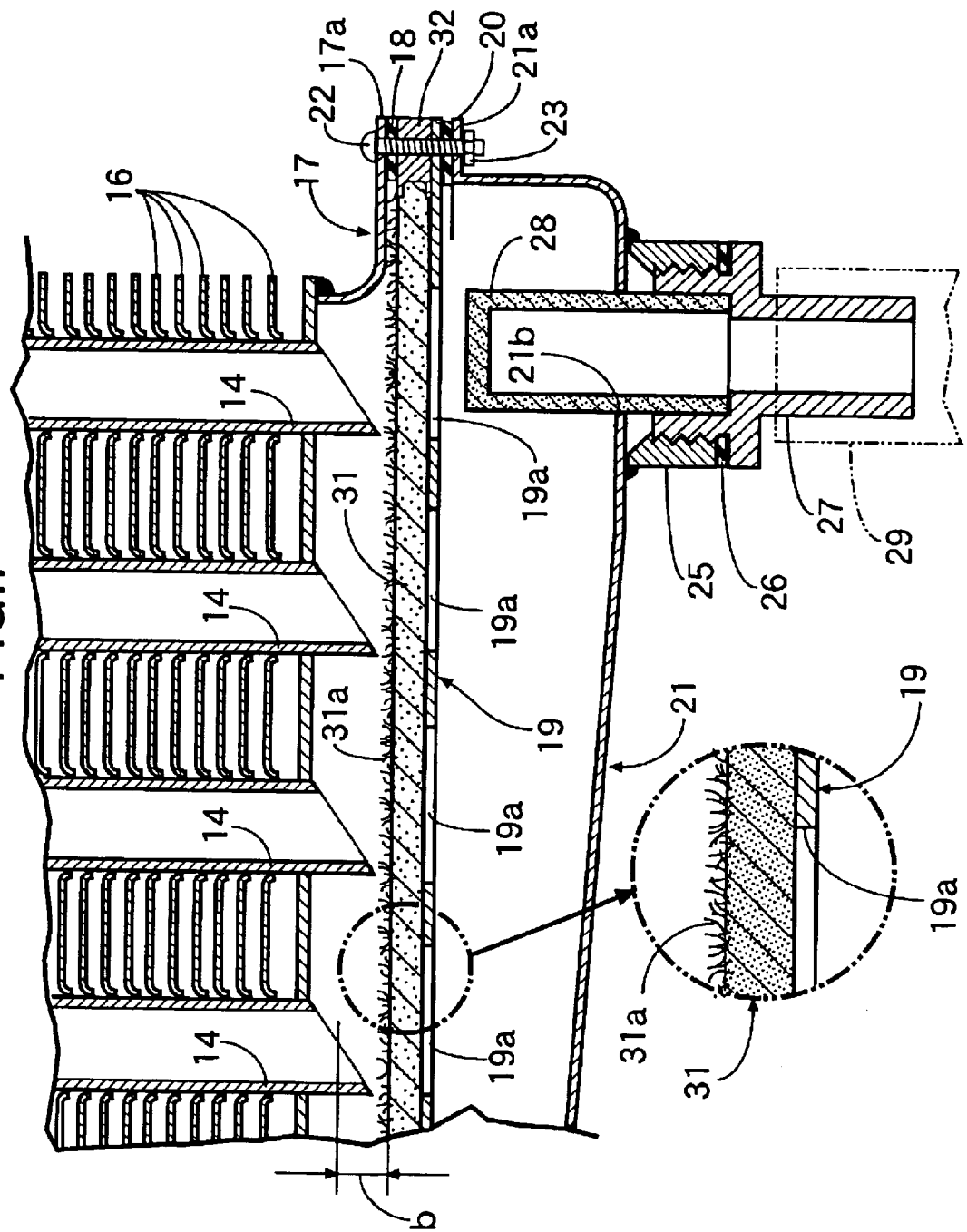
FIG. 7 is a view, corresponding to FIG. 3 above, of a third embodiment of the present invention.

Next, the third embodiment of the present invention is explained by reference to FIG. 7.

The third embodiment is an improvement of the second embodiment; it employs a filter 31 made of a fluffy material, and needle-shaped fibers 31a project out of the upper face thereof toward lower end openings of cooling pipes 14.

In accordance with the third embodiment, since the needle-shaped fibers 31a projecting from the filter 31 stick into droplets D growing in the lower end openings of the cooling pipes 14, the droplets D can be ruptured more effectively and absorbed by the filter 31.

Next, the fourth embodiment of the present invention is explained by reference to FIG. 8.

The third embodiment is an improvement of the first embodiment; it employs a filter 31 stacked on the lower face of a partition 19, the filter 31 being the same as that in the second embodiment.

In accordance with the fourth embodiment, droplets D that have been ruptured by contact with needle-shaped members 24 can be quickly drawn in by the capillary action of the filter 31. Furthermore, since the filter 31 can remove dust contained in the water, it is possible to reduce the size of a ceramic strainer 28 or eliminate the ceramic strainer 28 because of the filtration effect of the filter 31. That is, the provision of the filter 31 can minimize the amount of dust that reaches the ceramic strainer 28, particularly if the diameter of dust that can filter through the filter 31 is set larger than the diameter of dust that can filter through the ceramic strainer 28; since large dust is filtered out by the filter 31, the ceramic strainer 28 only needs to filter out dust having a small diameter, and as a result its filtration effect can be maintained over a long period of time, thereby increasing the lifespan thereof.

Although embodiments of the present invention are explained in detail above, the present invention can be modified in a variety of ways without departing from the spirit and scope of the present invention.

For example, the droplet rupturing means is not limited to the needle-shaped members 24 and the filter 31 illustrated in the embodiments.

Furthermore, the cooling pipes 14 having a circular cross section are illustrated as the medium passage in the embodiments, but a pipe having a cross section other than a circle or a passage formed between two plates may be employed.

Moreover, the air-cooled cooling fins 16 are illustrated as the heat-releasing means in the embodiments, but a water-cooled water jacket may be used. Furthermore, the cooling medium is not limited to air or water, and any type of cooling medium having different cooling performance characteristics can be employed.

Moreover, the condenser 5 of the Rankine cycle system 2 is illustrated in the embodiments; the present invention can be applied to a condenser 5 for any purpose, and its medium is not limited to water either.

Furthermore, the partition 19 and the water-collecting tray 21 are detachably fixed by the bolt 22 and the nut 23 in the embodiments, but they may be fixed using a clip, etc. so as to be detached easily, thereby enhancing the convenience of maintenance.

INDUSTRIAL APPLICABILITY

As hereinbefore described, the condenser related to the present invention can be desirably applied to the liquefaction of vapor that has passed through an expander of a Rankine cycle system, but it is not limited to the Rankine cycle system and can also be used for any other purpose; in this case it is not limited to water and can be applied to any other medium.

What is claimed is:

1. A condenser, comprising:
a medium passage to which is supplied a gas phase medium that is to be cooled;
heat-releasing means connected to the medium passage, the gas phase medium being cooled by heat exchange with the heat-releasing means;
liquid phase medium recovery means provided beneath the medium passage, the gas phase medium being recovered as a liquid phase medium by condensation into the liquid phase medium recovery means; and
droplet rupturing means that makes contact with a droplet of the liquid phase medium that resides in a lower end opening of the medium passage, ruptures the droplet, and recovers the liquid phase medium into the liquid phase medium recovery means,
wherein the droplet rupturing means is a needle-shaped member bent in a crank shape, an extremity of the needle-shaped member extending upward and facing a lower end opening of the medium passage.

2. The condenser according to claim 1, wherein the liquid phase medium is recovered into the liquid phase medium recovery means via an opening of a partition beneath the droplet rupturing means.

3. The condenser according to claim 1, wherein a lower face of the liquid phase recovery means is inclined so that one end of the liquid phase recovery means in the longitudinal direction is lower than the opposite end.

4. The condenser according to claim 1, wherein the droplet rupturing means is a sheet-form filter which quickly draws the droplet by a capillary action and removes dust from the droplet.

5. The condenser according to claim 1, wherein the droplet rupturing means is at least one of the needle-shaped member and a sheet-form filter.

6. A condenser, comprising:
a medium passage to which is supplied a gas phase medium that is to be cooled;
heat-releasing means connected to the medium passage, the gas phase medium being cooled by heat exchange with the heat-releasing means;
liquid phase medium recovery means provided beneath the medium passage, the gas phase medium being recovered as a liquid phase medium by condensation into the liquid phase medium recovery means; and
droplet rupturing means that makes contact with a droplet of the liquid phase medium that resides in a lower end opening of the medium passage, ruptures the droplet, and recovers the liquid phase medium into the liquid phase medium recovery means,
wherein the distance between the lower end opening of the medium passage and the upper end of the droplet rupturing means is set smaller that the maximum vertical dimension of the droplet.

7. A condenser, comprising:
a medium passage to which is supplied a gas phase medium that is to be cooled;
heat-releasing means connected to the medium passage, the gas phase medium being cooled by heat exchange with the heat-releasing means;
liquid phase medium recovery means provided beneath the medium passage, the gas phase medium being recovered as a liquid phase medium by condensation into the liquid phase medium recovery means; and
droplet rupturing means that makes contact with a droplet of the liquid phase medium that resides in a lower end opening of the medium passage, ruptures the droplet, and recovers the liquid phase medium into the liquid phase medium recovery means,
wherein the droplet rupturing means resonates with externally input vibration and moves relative to the droplet.

8. A condenser, comprising:
a medium passage to which is supplied a gas phase medium that is to be cooled;
heat-releasing means connected to the medium passage, the gas phase medium being cooled by heat exchange with the heat-releasing means;
liquid phase medium recovery means provided beneath the medium passage, the gas phase medium being recovered as a liquid phase medium by condensation into the liquid phase medium recovery means; and
droplet rupturing means that makes contact with a droplet of the liquid phase medium that resides in a lower end opening of the medium passage, ruptures the droplet, and recovers the liquid phase medium into the liquid phase medium recovery means,
wherein the droplet rupturing means includes a filter for filtering the liquid phase medium.

* * * * *